(12) United States Patent
Reimchen et al.

(10) Patent No.: US 9,261,141 B2
(45) Date of Patent: Feb. 16, 2016

(54) BALL BEARING CAGE, AND GROOVED BALL BEARING PROVIDED THEREWITH

(71) Applicant: Schaeffler Technologies GmbH & Co. KG, Herzogenaurach (DE)

(72) Inventors: Alexander Reimchen, Herzogenaurach (DE); Andreas-Johann Bohr, Herzogenaurach (DE); Stephan Herbst, Erlangen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/359,170

(22) PCT Filed: Dec. 12, 2012

(86) PCT No.: PCT/EP2012/075157
§ 371 (c)(1),
(2) Date: May 19, 2014

(87) PCT Pub. No.: WO2013/087662
PCT Pub. Date: Jun. 20, 2013

(65) Prior Publication Data
US 2014/0321787 A1    Oct. 30, 2014

(30) Foreign Application Priority Data

Dec. 15, 2011   (DE) .......................... 10 2011 088 640

(51) Int. Cl.
*F16C 33/38*   (2006.01)
*F16C 33/42*   (2006.01)
*F16C 19/06*   (2006.01)

(52) U.S. Cl.
CPC ........... *F16C 33/3887* (2013.01); *F16C 33/427* (2013.01); *F16C 19/06* (2013.01)

(58) Field of Classification Search
CPC .... F16C 33/3887; F16C 33/42; F16C 33/422; F16C 33/427
USPC .................................. 384/490, 523, 528, 530
See application file for complete search history.

(56) References Cited

U.S. PATENT DOCUMENTS

| 5,404,642 | A |   | 4/1995 | Alling et al. |
| 5,806,990 | A | * | 9/1998 | Ueno et al. .................... 384/530 |
| 6,010,248 | A |   | 1/2000 | Ueno et al. |

(Continued)

FOREIGN PATENT DOCUMENTS

| CN | 1054657 A | 9/1991 |
| CN | 1139898 A | 1/1997 |

(Continued)

*Primary Examiner* — James Pilkington
(74) *Attorney, Agent, or Firm* — Volpe and Koenig, P.C.

(57) ABSTRACT

A ball bearing cage having a first ring element and a second ring element is provided. The ring elements are each formed from sheet metal, and each include axial bulges separated by support surfaces. Ball guide pockets are formed between facing bulging inner walls by joining the support surfaces of the two ring elements. The ring elements are formed in such a way that the bulging inner walls that define the ball guide pockets define a channel cross-section which is concave in relation to a ball and which has an inner and an outer ball contact zone. The channel cross-section has such a depth in a groove base lying between said inner and outer ball contact zones that, when the ball comes into contact with the ball contact zones, an intermediate space remains between the ball and the groove base lying between the ball contact zones.

7 Claims, 7 Drawing Sheets

(56) References Cited

U.S. PATENT DOCUMENTS

| | | | |
|---|---|---|---|
| 6,068,408 A * | 5/2000 | Mutoh et al. | 384/523 |
| 7,059,776 B2 * | 6/2006 | Kobayashi et al. | 384/470 |
| 8,714,827 B2 * | 5/2014 | Ishikawa et al. | 384/480 |
| 2008/0187263 A1 | 8/2008 | Spielfeld et al. | |
| 2011/0069918 A1 | 3/2011 | Wakuda et al. | |

FOREIGN PATENT DOCUMENTS

| | | |
|---|---|---|
| DE | 925203 | 3/1955 |
| DE | 3640633 | 6/1988 |
| DE | 3939438 | 6/1991 |
| JP | 2003013962 | 1/2003 |
| WO | 2010066293 A1 | 6/2010 |

* cited by examiner

BALL BEARING CAGE, AND GROOVED BALL BEARING PROVIDED THEREWITH

FIELD OF THE INVENTION

The invention relates to a ball bearing cage that is formed from two ring elements that are set axially on each other and are produced as shaped sheet metal parts. These two ring elements together form connecting sections arranged in the circumferential direction, as well as ball guide pockets lying in-between. Balls are held in the ball guide pockets in the installed state of the ball bearing cage and guided in this way in the running grooves of a bearing inner ring and a bearing outer ring.

Furthermore, the invention also relates to a grooved ball bearing that is equipped as such with a ball bearing cage by which the balls are guided and in this way kept at a distance in the circumferential direction.

BACKGROUND

From DE 925 203 A a ball bearing cage of the construction noted above is known. The two cage halves are here riveted in the area of connecting sections or connected to each other by a special connecting structure formed by the cage halves.

From DE 39 39 438 A1 a ball bearing cage for a grooved ball bearing is likewise known that is assembled from two ring elements. The ring elements are shaped so that the ball guide pockets formed therein have a non-round contour in a top view of a ball guide pocket.

Finally, from DE 36 40 633 A1 another ball bearing cage assembled from two ring elements for a grooved ball bearing is known in which the contact plane between the two ring elements is offset in the axial direction relative to a ball center plane defined by the ball pocket centers.

Sheet metal cages with inner, spherically concave pockets (ball-shaped pockets) are used to a great extent in grooved ball bearings. The cage is here typically made from two ring-shaped cage halves that are assembled in the axial direction and can be connected to each other in different ways (e.g., riveted cages, tabbed cages, and welded cages). The balls are here guided into the functional position (installed in the bearing) by the cage in the ball-shaped pockets. Here, care must be taken that the cage remains guided by a roller body, i.e., the cage does not contact the bearing rings. The roller body guide or the radial play is defined by the ring domed geometry of each ball guide pocket. The design/definition of the unsupported ball span is typically tailored to the ideal geometry. The radial clearance is here defined by the diameter of the cage pocket at the cage outer edges.

Sheet metal cages of this construction are produced by punching (cutting). Thus, all of the punching surfaces on one side have a punch entry and on the other side a punch outlet/punching burr. In order to not disrupt the movement of the ball (noise, friction), the punching direction is normally selected so that the punch entry is on the inside of the ball pocket. Because the sheet metal is also thicker with increasing ball diameter, the dimension of the punch entry also increases. Consequently, the unsupported ball span is large and the cage can run, under some circumstances, on the bearing ring.

SUMMARY

The invention is based on the objective of providing a ball bearing cage for a grooved ball bearing, wherein this cage can be produced economically and is distinguished by an advantageous mechanical operating behavior.

This objective is met according to the invention by a ball bearing cage with:
  a first ring element that is produced as a shaped sheet metal part and has axial bulges arranged in the circumferential direction and separated from each other by seating surfaces,
  a second ring element that is likewise produced as a shaped sheet metal part and likewise has axial bulges arranged in the circumferential direction and separated by seating surfaces, and
  ball guide pockets that are formed via the joining of the seating surfaces of the two ring elements between the bordering bulge inner walls, each for holding a ball,
  wherein the ring elements are formed such that each of the bulging inner walls bordering the ball guide pockets form a concave groove cross section relative to the ball and the groove cross section has a recessed construction in an inner area lying between these inner and outer ball contact zones such that a gap remains between the cage and its inner area and thus the ball does not contact the inner area.

In this way it is advantageously possible to create a ball bearing cage in which the contact points of each ball with the cage are shifted in the direction of the pocket center. In this way, advantageously the effect of the so-called punch entry on the radial freedom of movement of each ball in the cage pocket allocated to it is reduced, in particular, the punch entry no longer has an effect on the unsupported ball span. In addition, it is advantageously possible by this construction to reduce the contact surfaces of the ball in the cage pocket relative to conventional cage constructions. Advantageously, the friction moment generated by frictional forces between the ball and cage is reduced accordingly.

The groove cross section is advantageously constructed such that the ball contact zones include, to the inner or outer edge of the ring elements, a radial distance of at least the ring width and the balls cannot contact the edge area of the ring elements thus lying outside of the ball contact zones.

In the ball bearing cage according to the invention, the cage pocket has, in cross section, a "roof shape" at least in certain peripheral zones. The contact points between the ball and cage still lie significantly within the inner geometry of the cage pocket. The concept according to the invention is suitable, in particular, for grooved ball bearings with larger dimensions.

The invention is essentially directed at the design of a ball cage made from sheet steel for grooved ball bearings. The invention can be used both in the industrial and also automotive sectors. The shape of the cage pocket is shaped according to the invention such that the radial clearance (unsupported ball span) of the ball is determined by an area of the ring elements influenced less pronouncedly by the edge geometry of the ring elements and thus can be exactly defined and maintained.

According to one especially preferred embodiment of the invention, the ball bearing cage is constructed such that the inner ball contact zone is formed by a locally straight inner wall section in axial section. Advantageously, the outer ball contact zone is also formed by a locally straight outer wall section in axial section. This construction advantageously produces lubricant gap geometries that support the establishment of a lubricating film between the cage and ball. These two wall sections are set at an obtuse angle relative to each other. The transition area connecting these two wall sections, i.e., the valley or groove base, does not contact the ball, but instead forms a gap for the ball when the ball contacts the ball contact zones.

The grooved ball bearing cage according to the invention is advantageously constructed such that the two straight inner and outer wall sections in axial section are connected by a grooved base section and there is a curvature in this grooved base section whose radius is smaller than the ball radius. The ball guide pockets can be constructed here so that these surround each ball with minimal play, producing minimal freedom of movement for the ball in the radial direction.

The ring elements are advantageously produced as punching shaped parts. It is also possible to produce the ring elements from a tape material and either to connect the joints or to place them when joining the ring elements so that the joints of a ring element are bridged by the other ring element.

The two ring elements are connected advantageously by riveting the two ring elements in the area of the seating surfaces. As an alternative, it is also possible to connect the ring elements through welding, soldering, or in some other way through suitable geometric structures.

Advantageously the radial width of the ring elements is approximately 40% to 55%, in particular 44% of the ball diameter in the area of the ball guide pockets. The radial freedom of movement of the ball in the ball guide pocket is advantageously in the range of 2% to 12% of the ball diameter. The radial distance of the inner limits of the ball contact zones is advantageously in the area of 20% to 30% of the radial width of the ring elements. The distance of the outer limits of the two ball contact zones is advantageously approximately 80% of the ring width.

The ball bearing cage according to the invention is formed of two ring elements assembled in the axial direction. These form ball guide pockets in the assembled state. These ball guide pockets extend to a cylinder casing coaxial to the bearing axis and surround the balls equatorially. Essentially at the height of the circulating track of the ball centers, the geometry of the inner wall of the ball guide pockets is adjusted so that a crescent-shaped intermediate space in axial section is produced between the inner wall of the ball guide pocket and the surrounded ball. This open area is bounded by inner and outer ball contact zones. These inner and outer ball contact zones do not extend up to the inner and outer edge of the respective ring element, but instead maintain a certain distance to these elements. This distance is advantageously large enough that, in the area of the contact zones, there is no material deformation caused by punching of the ring elements, especially burrs.

The invention is also essentially directed at a ball bearing cage that is formed from first and second ring elements, wherein these two ring elements form ball pockets arranged in the circumferential direction. Each of the bulging inner walls defining the ball guide pockets form an inner and an outer ball contact zone. The cross section of the ring elements in the area of the ball pockets is further constructed so that this forms an inner groove area lying between the inner and outer ball contact zones, so that a gap remains between the inner groove area and the ball when the ball contacts the ball contact zones.

BRIEF DESCRIPTION OF THE DRAWINGS

Additional details and features of the invention are given from the following description in connection with the drawings. Shown are.

DETAILED DESCRIPTION OF THE PREFERRED EMBODIMENTS

Figure 1:
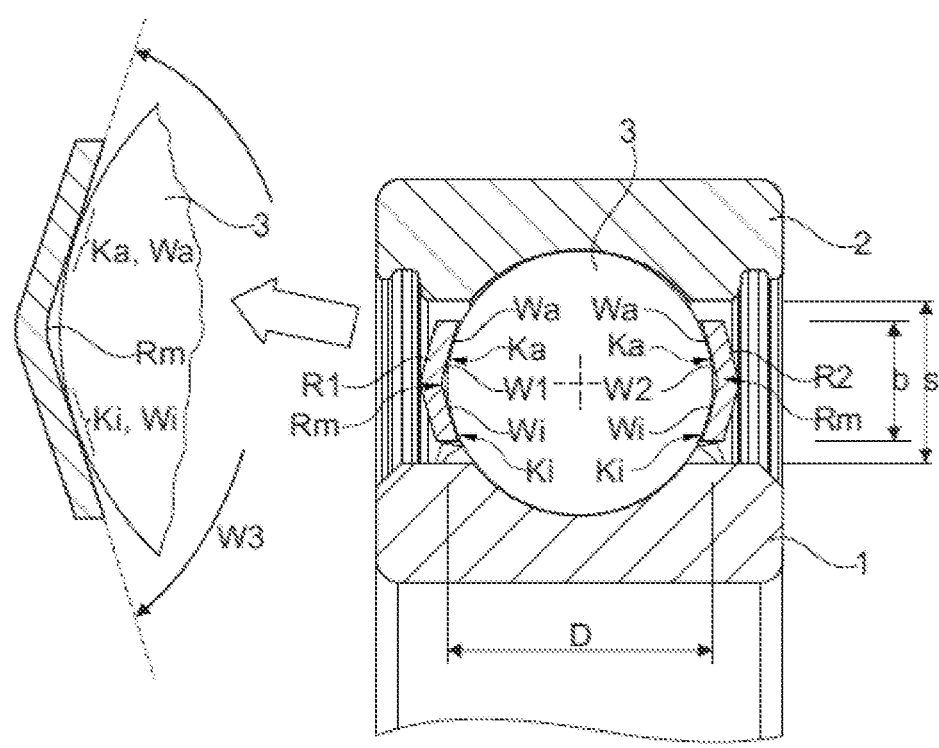
FIG. 1 an axial section detail for explaining a first embodiment of a grooved ball bearing that is equipped as such with a ball bearing cage according to the invention.

In FIG. 1, a grooved ball bearing is shown that is equipped with a ball bearing cage according to the invention. The grooved ball bearing comprises a bearing inner ring 1, a bearing outer ring 2, and balls 3 that are held in a ball track space defined between the two bearing rings 1, 2.

The balls 3 are guided by the ball bearing cage according to the invention. This ball bearing cage is formed of a first ring element R1 that is produced as a shaped sheet metal part and has axial bulges arranged in the circumferential direction and separated by seating surfaces. The ball bearing cage is further formed of a second ring element R2 that is likewise produced as a shaped sheet metal part and likewise has axial bulges arranged in the circumferential direction and separated by seating surfaces.

The two ring elements R1, R2 are assembled so that these contact each other via their seating surfaces and also the bulges point in opposite directions. In this assembly state, the bulges form the ball guide pockets that can be seen here each for holding a ball 3. The ball guide pockets form bulging inner walls W1, W2. These bulging inner walls obtain a special geometry according to the invention. Thus, the ring elements R1, R2 are constructed in the area of the ball guide pockets so that each of the bulging inner walls W1, W2 bordering the ball guide pockets forms a concave groove cross section for the ball 3 with inner and outer ball contact zones Ki, Ka. This produces a wall geometry that creates a two-zone guidance of the ball. Here, the cross section is adjusted so that it forms a groove cross section. This groove cross section is set deeper in a groove base or bottom area Rm between the inner and outer ball contact zones than the bulging of the ball 3 contacting the ball contact zone Ki, Ka. This produces a gap in the groove base or bottom area.

The cross-sectional construction described here is directed toward cross sections of ring element material in sectional planes, in particular, sectional plane bundles that contain a radial axis through which the center of each ball guide pocket runs and here is perpendicular to the bearing axis. The ball guide pocket can be constructed so that the special groove cross section in the described sectional plane extends over the predominant part of the ball circumference. The cross-sectional shape can also be limited to certain peripheral zones, in particular, to those peripheral zones of the ball guide pocket that support the ball in the circumferential direction. The lateral flank areas can deviate from the geometry according to the invention. The narrow transition area directly on the ball center circulating path between the bulges and the ring seating surfaces can also have local geometry deviating from the disclosed geometry.

As emerges especially from the detail view associated with FIG. 1, in the embodiment shown here the groove cross section is contoured such that the inner ball contact zone Ki is formed by a straight inner wall section Wi in the axial section here. The outer contact zone is formed by a straight outer wall section Wa in axial section. The two straight inner and outer wall sections Wi, Wa in axial section are connected by a grooved base section Rm. In this groove base section Rm there is a curvature whose radius is smaller than half the ball diameter D. The ball bearing cage forms a "roof cross section" with locally straight contact zones Ki, Ka in cross section. The inner angle W3 forms an obtuse angle of approximately 150°. The concavity of the cage between these contact zones Ki, Ka is greater than the convexity of the ball 5, so that a gap zone is produced in the area of the groove base section Rm for the ball 5. The outer limits of the ball contact zones adjacent to the ring edge are spaced apart from the ring edge so far that their position is not determined by production-dependent material deformation, in particular, differently formed edge burrs of the sheet metal material, and also these burrs cannot reach the ball 3.

The ball guide pocket shown here is constructed such that minimal freedom of movement for the ball in the radial direction can be defined extremely reliably but in a process-specific way. The ring elements R1, R2 are produced as punching shaped parts and riveted in the area of the seating surfaces still addressed in connection with FIG. 2. The radial width b of the ring elements R1, R2 in the area of the ball guide pockets is approximately 40% to 50% of the ball diameter.

In the embodiment shown here, the radial freedom of movement of the ball 3 in the ball guide pocket is in the range of 1% to 6% of half of the ball diameter D. The radial distance of the adjacent inner limits of the ball contact zones Ka, Ki is in the range of 60% to 80% of the ring width and in this actual example is at 69%.

Figure 2:
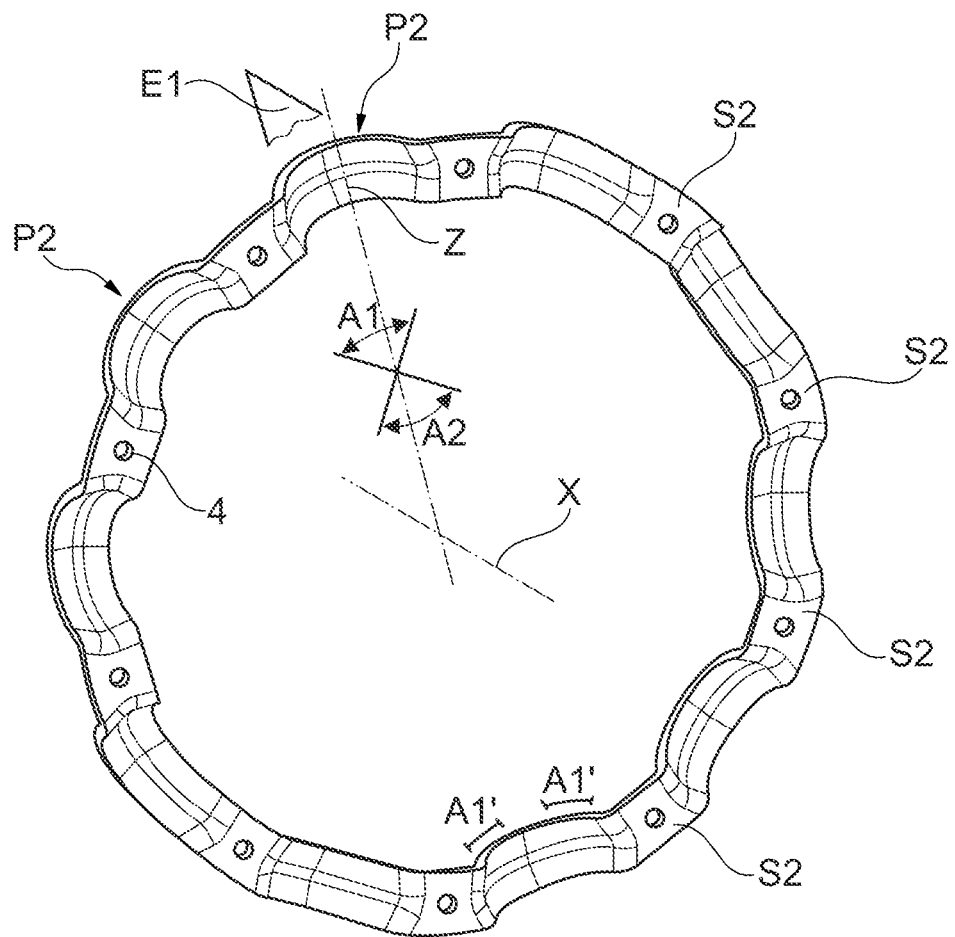
FIG. 2 a perspective view of a ring element of the ball bearing cage according to FIG. 1.

In FIG. 2, the ring element R2 of the ball bearing cage according to FIG. 1 is shown in the form of a perspective view. This ring element R2 is produced as a shaped sheet metal part from sheet steel. The ring element R2 forms several axial bulges P2 arranged in the circumferential direction and separated by seating surfaces S2. The first ring element R1 provided for the ball bearing cage according to FIG. 1 has a structurally identical construction. These two ring elements R1, R2 are joined by the seating surfaces S2 and riveted through the holes 4 that can be seen here. The composite part formed in this way forms ball guide pockets with a special shape—as already described with respect to FIG. 1. In FIG. 1, the cross section of the ring elements R1, R2 in a section plane El was described that is defined as such by the bearing axis X and the ball pocket center Z of each ball guide pocket P2. The construction of the groove cross section according to the invention must not extend over the entire periphery of the ball guide pocket P2, that is, not over the entire length of the ball guide belt. Advantageously, however, the cross-sectional shape according to the invention is provided at least in the angle zones A1, A2 indicated here. The ball guide pocket inner geometry according to the invention can also be applied to separate zones, so that local guide paths are produced with the double contact guide function described above.

Figure 3:
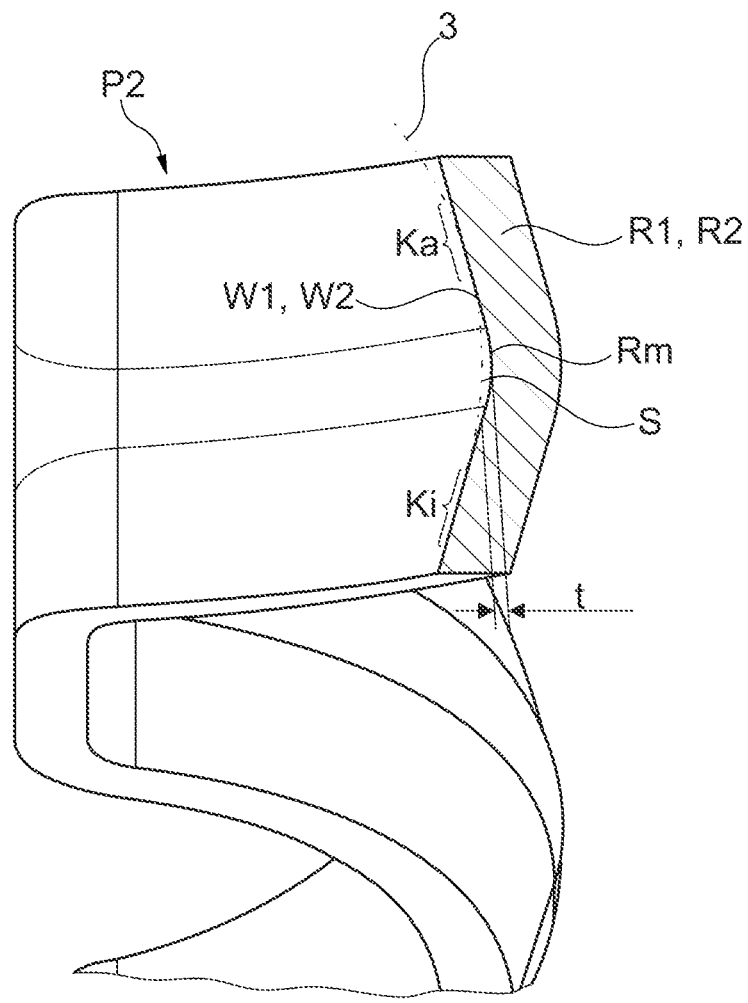
FIG. 3 a perspective detail for illustrating and explaining additional details of a ring element of a ball bearing cage according to the invention.

FIG. 3 further illustrates the special geometry of the ring elements R1, R2 according to the invention. As already described with respect to FIG. 1, the ring elements R1, R2 are constructed such that each of the bulging inner walls W1, W2 bordering the ball guide pockets P2 form a concave groove cross section for the ball 3 only indicated here with inner and outer ball contact zones Ki, Ka and the groove cross section is set deeper in a groove area Rm between these inner and outer ball contact zones Ki, Ka than the ball 3 contacting the ball contact zones Ki, Ka bulges toward this inner groove area. In the area between the inner and outer contact zones Ki, Ka, an intermediate space S is produced when the ball 3 contacts the bulging inner walls W1, W2. The maximum depth t of this intermediate space measured between the ball and groove area Rm is advantageously in the range of 1% to 7% of the ball diameter.

Figure 4A:
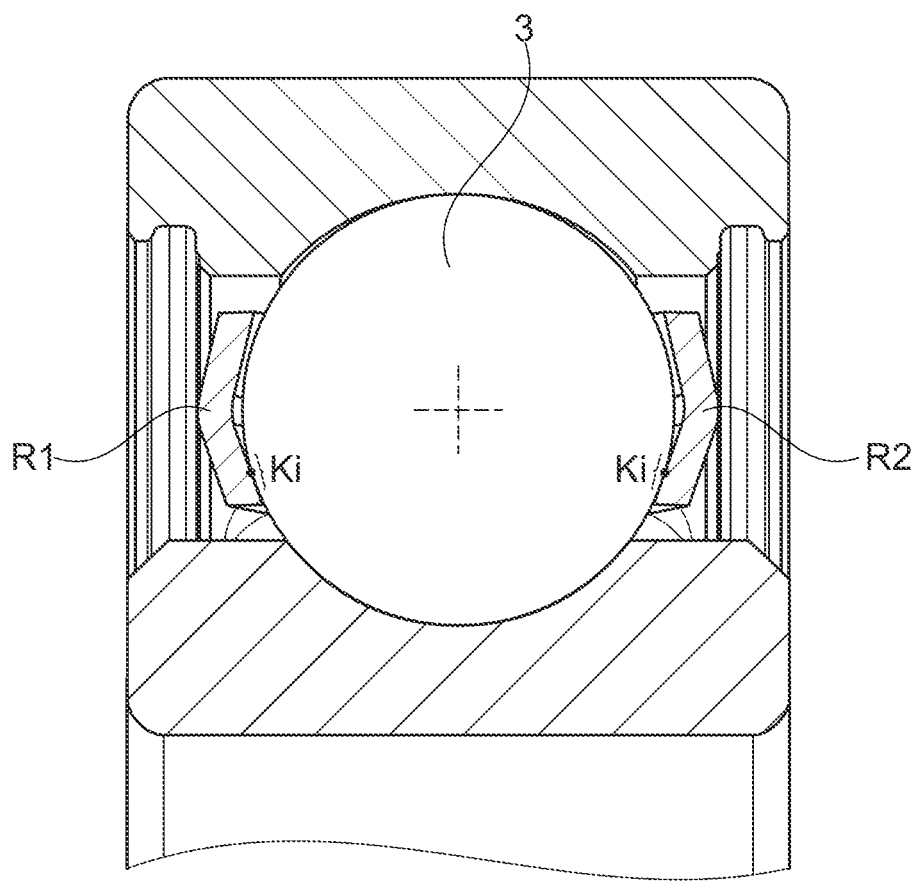
FIG. 4A an axial section detail similar to FIG. 1 for illustrating a state in which an inner ball contact zone of the groove cross section of the ball bearing cage contacts the ball.

FIG. 4A shows a state in which the ball bearing cage is displaced outward in the radial direction such that the ring elements R1, R2 contact the ball 3 by their inner ball contact zones Ki. Incidentally, the statements for FIG. 1 also apply accordingly for this view. In the diametrically opposite ball guide pocket not shown here, the ring elements R1, R2 are supported on the corresponding ball by the outer contact zones Ka. This contact state is shown in FIG. 4B.

Figure 4B:
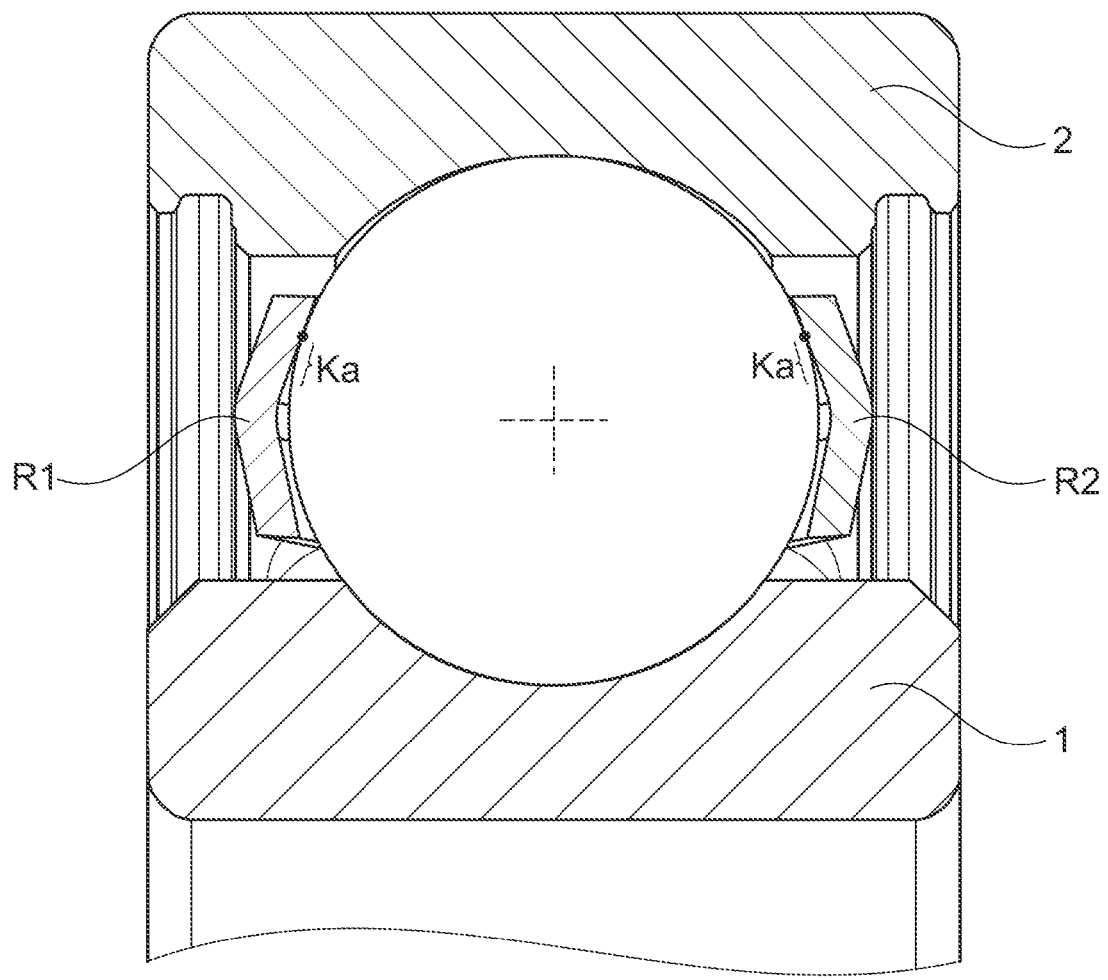
FIG. 4B an axial section detail similar to FIG. 1 for illustrating a state in which an outer ball contact zone of the groove cross section of the ball bearing cage contacts the ball.

As can be seen from FIG. 4b, the ring elements R1, R2 can also contact the ball 3 by their outer contact zones Ka and thus guide the ball bearing cage formed by the two ring elements R1, R2 such that this does not contact the bearing rings 1, 2. The ball bearing cage is thus reliably guided with roller bodies.

Figure 5A:
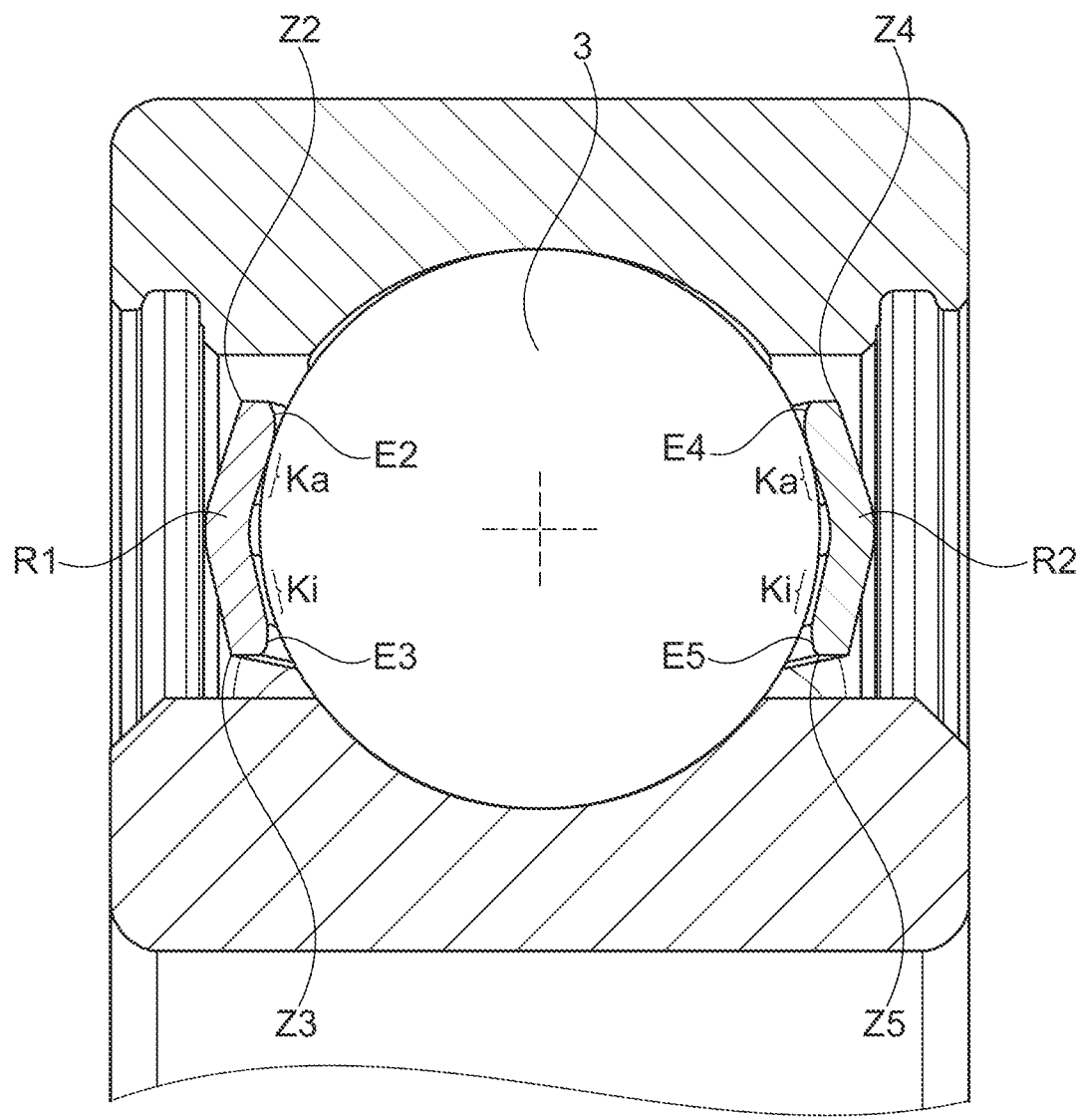
FIG. 5A an axial section detail for illustrating another cage variant in a state in which an outer ball contact zone of the groove cross section of the ball bearing cage contacts the ball.
Figure 5B:
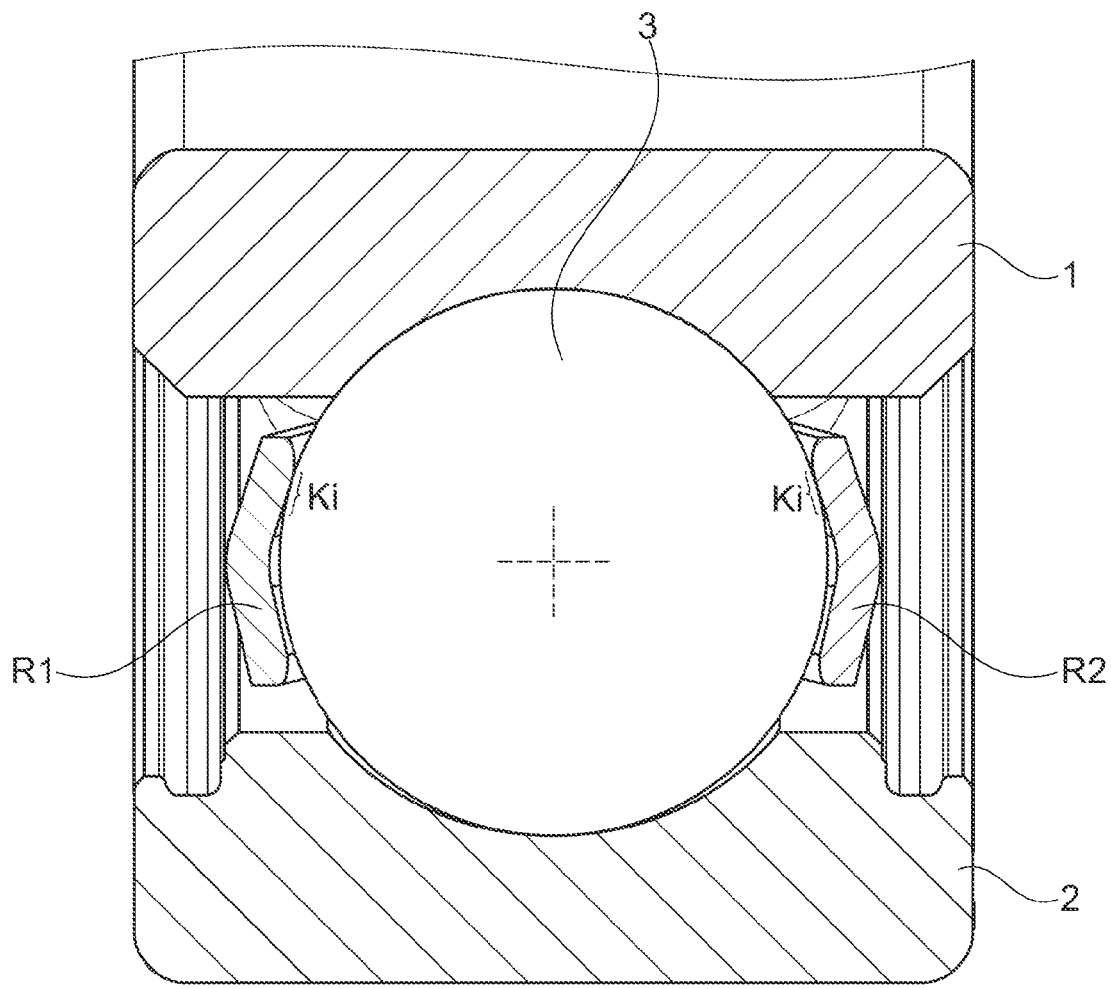
FIG. 5B an axial section detail for illustrating the cage variant according to FIG. 5A in a state in which an inner ball contact zone of the groove cross section of the ball bearing cage contacts the ball.

FIGS. 5A and 5B show an embodiment of a ball bearing cage according to the invention in which the inner edges E2, E3, E4, E5 of the ring elements R1, R2 have a certain rounding. This rounding can be achieved by selecting the punching direction in the production of the ring elements R1, R2 such that the punching burrs Z2, Z3, Z4, Z5 form on the side of the ring elements R1, R2 facing away from the ball 3. Through the inward displacement of the ball contact zones Ki, Ka toward the ball equator, a ball bearing cage is created that offers improved contact and guide properties with respect to previous constructions. In the view according to FIG. 5A, the ball bearing cage contacts the ball 3 over its outer contact zones Ka. On the diametrically opposite side, the ball bearing cage contacts the ball 3 via the inner contact zones Ki as shown in FIG. 5B.

LIST OF REFERENCE NUMBERS

1 Bearing inner ring
2 Bearing outer ring
3 Ball
A1 Angle zone
A2 Angle zone
b Width (dimension)
D Ball diameter
E2 Inner edge
E3 Inner edge
E4 Inner edge
E5 Inner edge
Ka Outer ball contact zone
Ki Inner ball contact zone
P2 Ball guide pocket
Rm Groove base or bottom area
R1 Ring element
R2 Ring element
S2 Seating surface
T Depth (dimension)
W1 Bulging inner wall
W2 Bulging inner wall
Wa Straight outer wall section
Wi Straight inner wall section
W3 Inner angle X Bearing axis
Z Ball pocket center
Z2 Punching burr
Z3 Punching burr
Z4 Punching burr
Z5 Punching burr

The invention claimed is:

1. A ball bearing cage with:
a first ring element that is produced as a shaped sheet metal part and has axial bulges arranged in a circumferential direction and separated by seating surfaces,
a second ring element that likewise has axial bulges arranged in the circumferential direction and separated by seating surfaces,
the ring elements are constructed such that joining the seating surfaces of the two ring elements form ball guide pockets between opposing axial bulges, the ball guide pockets having bulging inner walls which face each other to define a respective pocket,
each of the bulging inner walls defining a concave groove cross section with an inner contact zone below the concave groove cross section and an outer contact zone above the concave groove cross section with the contact zones being formed by straight line wall sections that are inclined or angled toward the ball, and the concave groove cross section is constructed such that the contact zones are spaced from radially inner and outer edges of the ring elements by a radial distance of at least 4% of a ring radial width, and the balls cannot contact the edge area of the ring elements.

2. The ball bearing cage according to claim 1, wherein a radius of the concave groove cross section is smaller than half a ball diameter.

3. The ball bearing cage according to claim 1, wherein the ball guide pockets are formed such that a radial ball freedom of movement is produced.

4. The ball bearing cage according to claim 1, wherein the ring elements are punched, shaped parts.

5. The ball bearing cage according to claim 1, wherein the two ring elements are riveted together in an area of the seating surfaces.

6. The ball bearing cage according to claim 1, wherein the ring radial width is approximately 40% to 50% of a ball diameter in an area of the ball guide pockets.

7. The ball bearing cage according to claim 1, wherein a radial distance of adjacent inner boundaries of the contact zones is approximately 20% of a ring width.

* * * * *